though other
United States Patent Office 3,342,810
Patented Sept. 19, 1967

3,342,810
DERIVATIVES OF RIFAMYCIN SV
Nicola Maggi and Piero Sensi, Milan, Italy, assignors to Lepetit S.p.A., Milan, Italy
No Drawing. Filed July 9, 1965, Ser. No. 470,926
Claims priority, application Great Britain, July 31, 1964, 30,327/64
15 Claims. (Cl. 260—239.3)

The present invention concerns new antibiotic substances and the process for their preparation. In U.S. Patent 3,150,046 the preparation of the antibiotic rifamycin by fermentation of a strain of *Str. mediterranei* ATCC 13685 is described. As stated in said patent rifamycin is a mixture of antibiotic substances. One of these substances, rifamycin B, having the crude formula $C_{39}H_{49}NO_{14}$ is a diacid (pH 1½=2.8, pH 2½=6.7) and one of the acidic groups is a carboxyl group. One of the particular properties of this antibiotic is its increase in activity when dissolved in water, i.e. to turn into another substance having higher antibacterial activity. The more active product, called rifamycin S, has the crude formula $C_{37}H_{45}NO_{12}$ and by mild reduction can be converted into another new antibiotic of the rifamycin class, rifamycin SV ($C_{37}H_{47}NO_{12}$). The process for preparing rifamycin SV comprises oxidation of rifamycin B to rifamycin O, hydrolysis of rifamycin O to rifamycin S with release of glycolic acid and reduction of rifamycin S to rifamycin SV. Both rifamycin S and rifamycin SV lack the carboxyl group which is set free in the form of glycolic acid during the activation step.

The structure of the rifamycins has been published in Experientia 20, 336 (1964).

The present invention concerns new derivatives of rifamycin SV, namely, 3-formyl-rifamycin SV and its derivatives. More particularly the compounds of the invention are 3-formyl-rifamycin SV and its derivatives of the formula

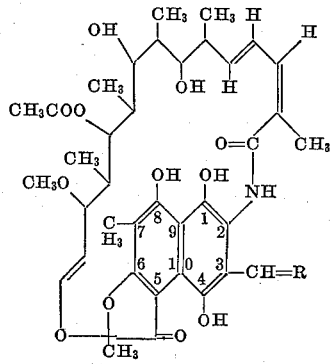

wherein R represents O, H(OH), dialkoxy, imino, substituted imino, hydrazono and substituted hydrazono radicals.

The key compound for the preparation of the above class of substances is 3-formyl-rifamycin SV, which also falls within the scope of the above generic formula. 3-formyl-rifamycin SV may be prepared starting from any of the Mannich bases of rifamycin SV, which are described in U.S. patent application Serial No. 442,166, filed on Mar. 23, 1965. According to one embodiment of this invention, the selected Mannich base of rifamycin SV is oxidized to 3-formyl-rifamycin SV by reaction with a weak oxidizing agent in a solvent. The preferred oxidizing agents are alkyl nitrites and lead tetracetate, although other agents have proved useful, such as persulfates, tetrachlorohydroquinone (chloranil) and so on. The choice of the solvent depends on the nature of the selected oxidizing agent, with which it must be compatible. When the oxidation is carried out using alkyl nitrites and lead tetracetate, halogenated solvents, such as chloroform and carbon tetrachloride give excellent results. It is sometimes useful to add catalytic amounts of an aliphatic acid, such as acetic acid, to the reaction mixture, in order to speed up completion of oxidation. The reaction runs at room temperature, and is complete, depending on the selected starting compounds, after 2 to 24 hours.

The conversion of 3-formyl-rifamycin SV to its functional derivatives as defined in the generic formula above, is carried out according to well known procedures. Thus, for instance, 3-hydroxymethyl-rifamycin SV is prepared by hydrogenation of 3-formyl-rifamycin SV with $NaBH_4$. The diacetals are prepared by prolonged contact of 3-formyl-rifamycin SV with a lower aliphatic alkanol at room temperature. The compound having the group —C=N— are prepared by reacting 3-formyl-rifamycin SV with hydroxylamine or the selected amino or hydrazino derivative through procedures which are well known to chemists.

The new rifamycin SV derivatives show a high degree of antibacterial activity in vitro, as is apparent from the following table, in which the minimal inhibitory concentration in γ/ml. against several pathogenic organisms is given. The symbol R is the same as in the generic formula above.

| R | M. aureus | S. pyog. | S. faec. | B. subt. | Proteus | E. coli | Kleb. pneu. | Pseudom. aereata | $H_{37}R_v$ |
|---|---|---|---|---|---|---|---|---|---|
| =O | 0.002 | 0.02 | 0.02 | 0.02 | 2 | 2 | 20 | 10 | 0.1 |
| =N—NH₂ | 0.02 | 0.05 | 0.2 | 0.2 | 50 | 20 | 50 | 50 | 1 |
| =N—NH—CH₂ | 0.05 | 0.05 | 0.05 | 0.1 | 20 | 10 | 20 | 50 | 5 |
| =N—NH—C₆H₅ | 0.005 | 0.1 | 0.05 | 0.05 | 10 | 5 | 10 | 20 | 2 |
| =N—NH—C₆H₄—COOH-p | 0.1 | 1 | 1 | 5 | >100 | >100 | >100 | >100 | >5 |
| =N—NH—CH₂C₆H₅ | 0.005 | 0.2 | 0.05 | 0.05 | 5 | 10 | 10 | 20 | 0.5 |
| =N—NH—CH₂CH₂OH | 0.01 | 0.1 | 0.05 | 0.1 | 10 | 10 | 50 | 50 | 1 |
| =N—N(CH₃)₂ | 0.001 | 0.02 | 0.01 | 0.01 | 5 | 5 | 10 | 20 | 0.1 |
| =N—N(C₂H₅)₂ | 0.002 | 0.05 | 0.02 | 0.01 | 1 | 5 | 10 | 10 | 0.02 |
| =N—N(C₃H₇)₂ | 0.002 | 0.2 | 0.05 | 0.02 | 2 | 5 | 10 | 20 | 0.05 |
| =N—N(C₄H₉)₂ | 0.01 | 1 | 0.1 | 0.1 | >100 | 20 | >100 | >100 | 0.5 |

| R | M. aureus | S. pyog. | S. faec. | B. subt. | Proteus | E. coli | Kleb. pneu. | Pseudom. aereata | $H_{37}R_v$ |
|---|---|---|---|---|---|---|---|---|---|
| =N—N(CH₃)(C₆H₅) | 0.001 | 0.2 | 0.05 | 0.02 | 1 | 5 | 5 | 10 | 0.02 |
| =N—N(CH₃)(CH₂CH₂N(CH₃)₂) | 0.01 | 0.01 | 0.05 | 0.5 | 5 | 2 | 5 | 10 | 0.5 |
| =N—N(pyrrolidinyl) | 0.001 | 0.05 | 0.01 | 0.01 | 5 | 5 | 5 | 10 | 0.1 |
| =N—N(piperidinyl) | 0.002 | 0.1 | 0.02 | 0.01 | 5 | 5 | 20 | 20 | 0.05 |
| =N—N(4-OH-piperidinyl) | 0.002 | 0.02 | 0.02 | 0.05 | 5 | 5 | 10 | 20 | 0.5 |
| =N—N(4-N(CH₃)₂-piperidinyl) | 0.005 | 0.05 | 0.05 | 0.2 | 20 | 2 | 5 | 10 | 2 |
| =N—N(4-piperidinyl-piperidinyl) | 0.005 | 0.10 | 0.05 | 0.05 | 5 | 5 | 10 | 10 | 0.5 |
| =N—N(morpholinyl) | 0.002 | 0.05 | 0.01 | 0.02 | 2 | 5 | 20 | 20 | 0.2 |
| =N—N(cyclohexyl) | 0.002 | 0.2 | 0.05 | 0.02 | 5 | 5 | 5 | 10 | 0.02 |
| =N—N(piperazinyl NH) | 0.005 | 0.02 | 0.05 | 0.2 | 5 | 5 | 5 | 5 | 2 |
| =N—N(4-CH₃-piperazinyl) | 0.002 | 0.02 | 0.01 | 0.02 | 5 | 1 | 5 | 10 | 0.5 |
| =N—N(2,6-diCH₃-4-CH₃-piperazinyl) | 0.002 | 0.05 | 0.02 | 0.02 | 2 | 5 | 10 | 10 | 0.5 |
| =N—N(2,6-diCH₃-4-CH₂C₆H₅-piperazinyl) | 0.001 | 0.5 | 0.05 | 0.02 | 5 | 20 | 20 | 50 | 0.2 |
| =N—N(triazolyl-NH) | 0.05 | 0.1 | 0.5 | 1 | 10 | 50 | 50 | 50 | >5 |
| =N—C₆H₅ | 0.005 | 0.1 | 0.02 | 0.1 | 5 | 10 | 20 | 20 | 5 |
| =N—(2-CH₃-C₆H₄) | 0.005 | 0.1 | 0.02 | 0.05 | 5 | 5 | 20 | 10 | 5 |
| =N—(3-CH₃-C₆H₄) | 0.002 | 0.1 | 0.02 | 0.05 | 2 | 5 | 20 | 10 | 5 |
| =N—(4-CH₃-C₆H₄) | 0.01 | 0.2 | 0.05 | 0.02 | 10 | 10 | 20 | 20 | >5 |
| =N—(4-Cl-C₆H₄) | 0.002 | 0.1 | 0.02 | 0.05 | 2 | 10 | 20 | 10 | >5 |
| =N—(naphthyl) | 0.002 | 0.05 | 0.02 | 0.02 | 5 | 10 | 20 | 20 | >1 |

| R | M. aureus | S. pyog. | S. faec. | B. subt. | Proteus | E. coli | Kleb. pneu. | Pseudom. aereata | $H_{37}R_v$ |
|---|---|---|---|---|---|---|---|---|---|
| =N—(pyridyl) | 0.002 | 0.05 | 0.02 | 0.02 | 5 | 10 | 20 | 10 | 5 |
| =N—(thiazolyl) | 0.005 | 0.05 | 0.02 | 0.05 | 5 | 10 | 20 | 20 | 5 |
| =N—(pyridyl) | 0.005 | 0.05 | 0.05 | 0.05 | 10 | 5 | 10 | 20 | 2 |
| =N—NHCO—NH$_2$ | 0.2 | 0.5 | 1 | 2 | >100 | 50 | >100 | >100 | 5 |
| =N—NH—C(=NH)—NH$_2$ | 0.5 | 1 | 5 | 10 | >100 | >100 | 50 | >100 | 5 |
| =N—NHSO$_2$—C$_6$H$_4$—CH$_3$ | 0.02 | 0.05 | 0.1 | 0.05 | 100 | 50 | 50 | 100 | 1 |
| =H(OH) | 0.1 | 0.2 | 1 | 1 | 100 | 50 | 50 | 50 | >5 |
| =(OCH$_3$)$_2$ | 0.005 | 0.05 | 0.05 | 0.05 | 10 | 5 | 20 | 10 | 5 |
| =NOH | 0.02 | 0.01 | 0.1 | 0.1 | 10 | 5 | 20 | 10 | 5 |
| =N—OCH$_3$ | 0.0005 | 0.01 | 0.005 | 0.01 | 2 | 5 | 10 | 10 | 0.05 |
| =N—OCH$_2$CH$_2$—N(morpholino) | 0.005 | 0.02 | 0.05 | 0.2 | 10 | 5 | 10 | 20 | 0.5 |

The new compounds of this invention have a very limited toxicity. For instance, formyl-rifamycin SV shows a $LD_{50}$ in mice of about 400 mg./kg. intravenously and about 1500 mg./kg. by oral route. Comparable results were obtained with the other substances of this class. The experiments in vivo confirmed the excellent antibiotic properties. In tests of prevention from experimental infection due to administration of 450 times the lethal dose of *Staphylococcus aureus* in mice the $ED_{50}$ of 3-formyl-rifamycin SV was 4.6 mg./kg. per os and 2.46 mg./kg. subcutaneously. After administration of about 800 $LD_{50}$ of *S. aureus* the corresponding $ED_{50}$ for the oxime of 3-formyl-rifamycin SV was 5.66 per os and 2.46 subcutaneously. The derivatives with phenylhydrazine and aniline gave the following corresponding values: the former 3.03 and 2.0; the latter 1.74 and 1.15 respectively.

As an indication of the antitubercular activity, which is shared by practically all of the compounds covered by the present application, the following table gives the in vivo activity of the two derivatives in mice infected with *Mycobacterium tuberculosis* $H_{37}R_v$. In a first experiment mice were treated orally once a day for 30 days, starting from 2 hours after the infection and held under control for 136 days. The results were as follows:

| Condensation product of formyl-rifamycin SV with— | Dose, mg./kg. | Number of mice | Number of survivals | Average rate of survival (days) |
|---|---|---|---|---|
| 4-aminomorpholine | 5 | 10 | 3 | 110 |
|  | 2 | 10 | 0 | 30 |
| Dimethylhydrazine | 5 | 10 | 9 | >136 |
|  | 2 | 10 | 2 | 100 |
| Controls | | 10 | 0 | 12.5 |

In a second experiment controlled for 68 days, in which therapy was conducted for 43 days starting from the third day after the infection, the results were as follows:

| Condensation product of formyl-rifamycin SV with— | Dose, mg./kg. | Number of mice | Number of survivals | Average rate of survival (days) |
|---|---|---|---|---|
| 1-amino-4-methylpiperazine | 10 | 10 | 9 | >68 |
|  | 5 | 10 | 7 | >68 |
| Dimethylhydrazine | 5 | 10 | 9 | >68 |
|  | 1 | 10 | 2 | 30 |
| Controls | | 10 | 0 | 11 |

Useful blood levels are reached by administration to humans of appropriate doses, as shown by the following table.

| Condensation product of formyl-rifamycin SV with— | Number of subjects | Dose | Blood levels average after administration ($\gamma$/ml.) | | |
|---|---|---|---|---|---|
| | | | 2 hrs. | 4 hrs. | 8 hrs. |
| Dimethylhydrazine | 12 | 150 | 1.56 | 2.32 | 1.55 |
| 1-amino-4-methylpiperazine | 8 | 150 | 3.04 | 1.39 | 0.46 |
| 4-aminomorpholine | 8 | 150 | 0.04 | 0.14 | 0.09 |
| 1-amino-3-hydroxypiperidine | 4 | 150 | 0.05 | 0.28 | 0.05 |

The following are examples of preparation of the compounds covered by the present invention.

EXAMPLE 1

*3-formyl-rifamycin SV*

To a solution of 7.8 g. of 3-pyrrolidinomethyl-rifamycin SV in a mixture of 340 ml. of carbon tetrachloride and 40 ml. of acetic acid, 6 g. of lead tetracetate are added, and the mixture is kept at about 20° C. for 15 hours. After pouring the mass into 500 ml. of phosphate buffer pH 7 the organic layer is separated, washed with a 1% aqueous solution of ascorbic acid and concentrated to a volume of about 150 ml. After addition of 150 ml. of ligroin the mixture is concentrated to a small volume. The red precipitate is collected and dried. Yield 3.5 g. The product has M.P. 180–185° (dec.). U.V. and visible spectrum $\lambda_{max.}$ at 327 m$\mu$ ($E_{1\,cm.}^{1\%}=261$) and 498 m$\mu$ ($E_{1\,cm.}^{1\%}=141.5$)

*Analysis.*—Calcd. for $C_{38}H_{47}NO_{13}$: C, 62.88; H, 6.53; N, 1.93. Found: C, 62.59; H, 6.84; N, 2.05.

Other suitable materials for the preparation of 3-formyl-rifamycin SV by mild oxidation either with lead tetracetate or with 1,4-benzoquinone, manganese dioxide or a salt of a peracid, such as ammonium persulfate, are the following rifamycin SV aminomethyl derivatives, which all give useful yields:

Diethylaminomethyl
Dimethylaminomethyl
Piperidinomethyl
Morpholinomethyl
2,6-dimethylpiperidinomethyl
1-methylpiperazinomethyl
4-carboxypiperidinomethyl, and others.

Alternatively, a preparation using a nitrite as the oxidant is described to better illustrate the invention.

A mixture of 78.3 g. of 3-diethylaminomethyl-rifamycin SV, 390 ml. of carbon tetrachloride, 270 ml. of acetic acid and 1.34 ml. of isoamyl nitrite is kept at 22° C. ±1° for 8 hours, then an additional 1.34 ml. of isoamyl nitrite is added and the mixture is kept for additional 16 hours at about 22° C. The mixture is diluted with 3800 ml. of carbon tetrachloride, washed with 3500 ml. of water containing 78 g. of ascorbic acid in solution and evaporated to dryness. The residue is recrystallized from tetrahydrofuran. Yield 31 g.

Analogous results were obtained using as the oxidizing agent either oxygen in the presence of Pd as the catalyst, or potassium ferricyanide.

EXAMPLE 2

*Dimethyl hydrazone of 3-formyl-rifamycin SV*

An amount of 0.720 g. of N,N-dimethylhydrazine (0.012 mole) dissolved in 15 ml. of tetrahydrofuran is added to a solution of 7.3 g. (0.01 mole) of formyl-rifamycin SV dissolved in 75 ml. of tetrahydrofuran, cooled in ice. After the addition the solution is allowed to stand at room temperature for 45 minutes, then concentrated to about 10 ml. The concentrate is taken up with about 150 ml. of ethyl acetate, an equal volume of ligroin is added, the mixture is concentrated to small volume, the precipitated product filtered, washed with ligroin, dried and crystallized from tetrahydrofuran. Yield 4 g. (51%) of yellow-orange crystals having M.P. 170–175° (decomposition).

*Analysis.*—Calcd. for $C_{40}H_{53}N_3O_{12}$: C, 62.57; H, 6.96; N, 5.47. Found: C, 62.80; H, 7.23; N, 5.34.

U.V. and visible spectrum at pH 7.38:

$\lambda_{max.}$ at 335 m$\mu$ ($E^{1\%}_{1cm.}=304$) and 475 m$\mu$ ($E^{1\%}_{1cm.}=186$)

EXAMPLE 3

*Semicarbazone of 3-formyl-rifamycin SV*

An amount of 7.3 g. (0.01 mole) of formyl rifamycin SV is suspended in 700 ml. of a mixture of tetrahydrofuran-water (1:1). Under cooling to 0–5° C. 1.20 g. (0.011 mole) of semicarbazide hydrochloride dissolved in 10 ml. of water are added, followed by a solution of 1.8 g. of sodium acetate in 10 ml. of water. The reaction is carried out at 4° C. for 15 hours. The solution is then concentrated to about ⅓ of the initial volume and extracted with ethyl acetate. The organic extract is concentrated to small volume: the yellow-orange crystals precipitated are washed with ethyl acetate and dried at 40° C. in vacuo. Yield 3.8 g. (48%) of product melting at 175–270° C. (decomposition).

*Analysis.*—Calcd. for $C_{39}H_{50}N_4O_{13}$: C, 59.84; H, 6.44; N, 7.16. Found: C, 60.06; H, 6.70; N, 7.30.

U.V. and visible spectrum (pH 7.38):

$\lambda_{max.}$ at 332 m$\mu$ ($E^{1\%}_{1cm.}=342.3$) and 475 m$\mu$ ($E^{1\%}_{1cm.}=195.1$)

EXAMPLE 4

*3-phenylimino-methylene-rifamycin SV*

To a solution of 7.3 g. (0.01 mole) of formyl-rifamycin SV in 50 ml. of tetrahydrofuran, cooled to about 5° C. a solution of 1 ml. (0.011 mole) of freshly distilled aniline dissolved in 10 ml. of tetrahydrofuran is added portionwise. At the end of the addition the solution is kept stirred at room temperature for 3 hours, then it is concentrated to small volume and the concentrate is taken up with 60–70 ml. of methanol. After a few minutes crystallization occurs. The crystalline precipitate of red-deep red colour is collected, washed with methanol and dried (6.6 g., yield 82%). The product, again recrystallized from MeOH shows the following characteristics: M.P. 240–245° C. (decomposition). U.V. and visible spectrum ($CHCl_3$):

$\lambda_{max.}$ at 358 m$\mu$ ($E^{1\%}_{1cm.}=318.3$) and 500 m$\mu$ ($E^{1\%}_{1cm.}=151.9$)

EXAMPLE 5

*3-hydroxymethyl-rifamycin SV*

An amount of 7.3 g. (0.01 mole) of formyl-rifamycin SV is suspended in 100 ml. of absolute ethanol. Under cooling a solution of 0.410 g. (0.04 mole) of $NaBH_4$ in 25 ml. of absolute ethanol is slowly added with stirring. At the end of the addition stirring is continued for 15 minutes, then the solution is concentrated to about 20 ml. and the concentrate is taken up with about 200 ml. of ethyl acetate. The solution is extracted with phosphate buffer of pH 7.3. The organic phase is discarded. The aqueous extracts are adjusted to pH about 2 and extracted with ethyl acetate. The extract is concentrated to about 50 ml., and about 50 ml. of ligroin are then added to the mixture which is once more concentrated to about 15 ml.

The formed yellow precipitate is collected (5.8 g.) and recrystallized from ethanol. Yield 3.8 g. (52%) of product having the following characteristics: M.P. 170° C. (decomposition).

*Analysis.*—Calcd. for $C_{38}H_{49}NO_{13}$: C, 62.71; H, 6.69; N, 1.92. Found: C, 62.57; H, 7.08; N, 2.10.

U.V. and visible spectrum (pH 7.38):

$\lambda_{max.}$ at 307 m$\mu$ ($E^{1\%}_{1cm.}=260.7$) and 445 m$\mu$ ($E^{1\%}_{1cm.}=143.7$)

EXAMPLE 6

*Dimethylacetal of 3-formyl-rifamycin SV*

A solution of 7.3 g. of 3-formyl-rifamycin SV in 300 ml. of methanol is allowed to stand 3 hours at room temperature, then it is concentrated to about 40 ml. On cooling for 10 hour at about 0° the diacetal is collected and dried. Yield 5.6 g. (68%) of orange yellow crystals, which decompose slowly above 175° C. The U.V. and visible spectrum show maxima at 315 m$\mu$ ($E^{1\%}_{1cm.}=266.4$) and 450 m$\mu$ ($E^{1\%}_{1cm.}=182.7$)

EXAMPLE 7

*Oxime of 3-formyl-rifamycin SV*

A mixture of 7.3 g. of 3-formyl-rifamycin SV, 200 ml. of tetrahydrofuan, 27 ml. of pyridine and 0.75 g. of hydroxylamine hydrochloride is stirred for 3 hours at room temperature, then it is poured into about 2 litres of ice water, made acidic with hydrochloric acid and extracted with ethyl acetate. The organic extract is concentrated to about 50 ml. and cooled. Orange crystals separate, which are collected and dried. Yield 5.7 g. (76%); M.P. 190–193° C. The U.V. and visible spectrum shows maxima at 323 m$\mu$ ($E^{1\%}_{1cm.}=273.9$) and 468 m$\mu$ ($E^{1\%}_{1cm.}=179.4$)

EXAMPLE 8

*Hydrazone of 3-formyl-rifamycin SV*

To a solution of 0.6 ml. of hydrazine hydrate in 50 ml. of tetrahydrofuran a solution of 7.3 g. of 3-formyl-rifamycin SV, in 100 ml. of tetrahydrofuran is slowly added at 5–10° C. The mixture is concentrated to about 20 ml., diluted with a mixture of 200 ml. of ethyl acetate and 200 ml. of ligroin and concentrated to a small volume. On cooling, purpura-red crystals separate and are collected and dried. Yield 5 g. (67.5%), M.P. above 165° with decomposition. The U.V. and visible spectrum shows two maxima at 325 mμ ($E_{1cm.}^{1\%}=247.4$) and 473 mμ ($E_{1cm.}^{1\%}=152$)

When the same starting compounds of this example are reacted together at higher temperatures, f.i. at the boiling point of tetrahydrofuran, a cyclization occurs with formation of a rifamycin-[4,3-c]-pyrazole, having the group

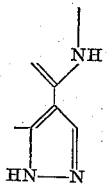

EXAMPLE 9

Phenylhydrazone of 3-formyl-rifamycin SV

Prepared by the process of Example 8 using 1.3 g. of phenylhydrazine instead of hydrazine. Yield 4.8 g. (59%), M.P. 200–205° C. (dec.); orange-yellow crystals. The U.V. and visible spectrum shows maxima at 358mμ ($E_{1cm.}^{1\%}= 208.5$) and 484 mμ ($E_{1cm.}^{1\%}=202.1$)

EXAMPLES 10 to 43

The condensation products of formyl-rifamycin SV with a series of amines and hydrazines show the properties indicated in the following table. The process for their preparation was practically the same as indicated in the preceding examples.

| Compound condensed with formyl-rifamycin SV | M.P., ° C. (dec.) | U.V.-Spectrum | |
|---|---|---|---|
| | | $\lambda_{max.}$ (mμ) | $E_{1cm.}^{1\%}$ |
| 1-aminoguanidine | ~270 | 337 479 | 304.1 183.6 |
| 4-methylbenzenesulfonylhydrazine | 150+157 | 348 479 | 238 142 |
| o-Toluidine | 255+260 | 325 490 | 177 141 |
| m-Toluidine | 180+183 | 325 490 | 201 148 |
| p-Toluidine | 170+175 | 325 490 | 169 155 |
| p-Chloroaniline | 170+175 | 325 490 | 174.4 157.4 |
| 2-aminopyridine | >270 | 262 308 487 | 417 208 174.3 |
| 4-aminopyridine | 185+190 | 260 320 485 | 514 168 146 |
| 2-aminothiazole | 170+180 | 260 360 502 | 391 219 162.3 |
| 2-naphthylamine | 165+170 | 268 *360 500 | 493 282 140 |
| 4-dimethylaminoaniline | 180+190 | | |
| Methylhydrazine | 160+170 | 330 470 | 342 191 |
| 2-hydroxyethylhydrazine | ~250 | 333 475 | 329 192 |
| Benzylhydrazine | 155+160 | 234 334 475 | 381 315 177 |
| 4-carboxyphenylhydrazine | ~185 | 365 488 | 302 258 |
| 1-methyl-1-phenylhydrazine | 195+200 | 353 485 | 265 222 |
| 1,1-diethylhydrazine | 165+177 | 338 478 | 310.5 187.8 |
| 1,1-dipropylhydrazine | 140+150 | 342 480 | 300.3 187.4 |
| 1,1-dibutylhydrazine | 185+190 | 343 481 | 280 186 |
| 1-aminopyrrolidine | 240+250 | 338+340 476+480 | 304.7 187.5 |
| 1-aminopiperidine | 250+258 | 235 333 475 | 385 303 177 |
| 3-hydroxy-1-aminopiperidine | 180+185 | 237 334 470 | 330 316 183 |
| 1-aminoazepine | 245+260 | 343+345 478+480 | 320 199.3 |
| 4-aminomorpholine | 260+267 | 335 475 | 321 186 |
| 1-aminopiperazine | ~170 | 335 475 | 337 190 |
| 4-methyl-1-aminopiperazine | 183+188 | 238 334 476 | 380 316 180 |
| 2,4,6-trimethyl-1-aminopiperazine | 170+175 | 325 480 | 200.4 157 |
| 2,6-dimethyl-4-benzyl-1-aminopiperazine | 150+160 | 325 475 | 200 146 |
| 4-dimethylamino-1-aminopiperidine | ~160 | 335 472 | 304 171.5 |
| 4-(1-piperidino)-1-aminopiperidine | ~240 | 334 475 | 275 159.3 |
| 1-(2-dimethylaminoethyl)-1-methylhydrazine | 192+195 | 337 475 | 353.2 170.3 |
| 4-aminotriazole | 240+247 | 230 262 338 494 | 422 417 277.5 184.2 |
| O-methyl-hydroxylamine | 240+250 | 325 470 | 298 198 |
| O-[2-(4-morpholino)-ethyl]-hydroxylamine | 157+162 | 325 465+470 | 253.2 164.3 |

*(CHCl₃).

We claim:
1. A process for preparing a rifamycin SV derivative of the formula

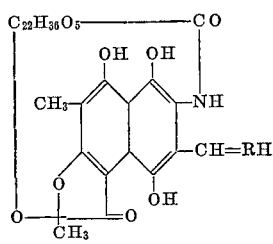

wherein R represents oxygen, H(OH), dialkoxy, imino, substituted imino, hydrazono and substituted hydrazono radicals, which comprises subjecting to mild oxidation a 3-aminomethyl derivative of rifamycin SV of the formula

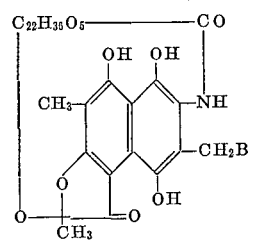

wherein the group $C_{22}H_{36}O_5$ in each formula has the structure

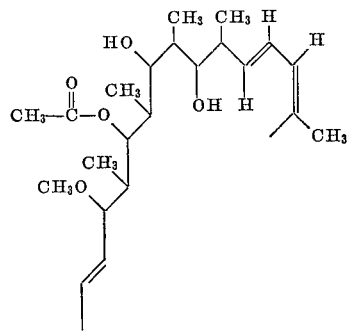

wherein B is a radical selected from

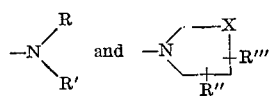

in which R is a member selected from the group consisting of hydrogen and lower alkyl, R' is a member of the class consisting of lower alkyl, hydroxy-lower alkyl, carboxy-lower alkyl and cycloalkyl groups, X is a member of the class consisting of methylene, ethylene, a group —$CH_2O$— and a group —$CH_2NH$—, R'' and R''' are members of the class consisting of hydrogen, lower alkyl, hydroxy and carboxy groups, with an oxidizing agent of the class consisting of lower alkyl nitrites, lead tetracetate, 1,4-quinones, persulfates, oxygen in the presence of a catalyst, potassium ferricyanide and manganese dioxide, whereby 3-formyl-rifamycin SV is obtained, and subjecting said 3-formyl-rifamycin SV,
  (a) either to hydrogenation with sodium borohydride to obtain 3-hydroxymethyl-rifamycin SV,
  (b) or to reaction with lower alkanols at room temperature to obtain a lower dialkyl acetal of 3-formyl-rifamycin SV,
  (c) or to reaction with a compound selected from the class consisting of primary aliphatic, aromatic and heterocyclic amines, hydroxylamine, O-substituted hydroxylamines, hydrazine and substituted hydrazines.

2. A process for preparing formyl-rifamycin SV, which comprises subjecting a 3-aminomethyl-rifamycin SV to mild oxidation with a oxidizing agent of the class consisting of lower alkyl nitrites, lead tetracetate, 1,4-benzoquinone, ammonium persulfate, oxygen in the presence of a catalyst, potassium ferricyanide and manganese dioxide.

3. A process for preparing 3-hydroxymethyl-rifamycin SV, which comprises hydrogenating 3-formyl-rifamycin SV with sodium borohydride in a lower alkanol at room temperature.

4. A process for preparing a di-lower alkyl acetal of 3-formyl-rifamycin SV, which comprises contacting 3-formyl-rifamycin SV with a lower alkanol at room temperature.

5. A process for preparing a 3-formyl-rifamycin SV derivative of the formula

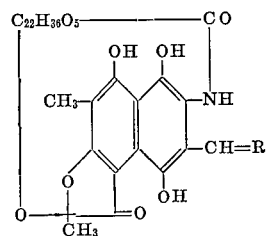

wherein the group $C_{22}H_{36}O_5$ in each formula has the structure

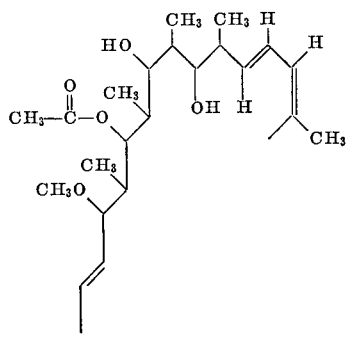

wherein R is a member of the class consisting of imino substituted imino, hydrazono and substituted hydrazono radicals, which comprises contacting 3-formyl-rifamycin SV with a compound selected from the class consisting of primary aliphatic, aromatic and heterocyclic amines, hydroxylamine, O-substituted hydroxylamines, hydrazine and substituted hydrazines.

6. A compound of the formula

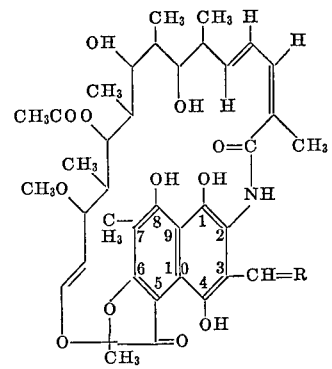

wherein R is a member of the class consisting of
  (a) oxygen, H(OH), dimethoxy and an imino group of the formula =N—$R_1$ wherein $R_1$ is a member of the class consisting of OH, methoxy, tolyl, chlorophenyl, naphthyl, 4-dimethylaminophenyl, pyridyl, thiazolyl and morpholinoethoxy, and
  (b) a hydrazono group of the formula

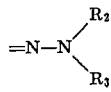

wherein $R_2$ is a member of the class consisting of hydrogen and lower alkyl groups, and $R_3$ is a member of the class consisting of hydrogen, lower alkyl, hydroxy-lower alkyl, dimethylaminoethyl, p-tolylsulfonyl, phenyl, p-carboxyphenyl, guanyl, carbamyl, and benzyl, and wherein $R_2$ and $R_3$, taken together with the nitrogen, form a heterocyclic ring of 5–7 atoms.

7. 3-formyl-rifamycin SV.
8. 3-formyl-rifamycin SV dimethyl hydrazone.
9. 3-formyl-rifamycin SV oxime.
10. 3-formyl-rifamycin SV methyl oxime.
11. 3-formyl-rifamycin SV semicarbazone.
12. 3-formyl-rifamycin SV hydrazone.
13. 3-formyl-rifamycin SV dimethyl acetal.
14. 3-hydroxymethyl-rifamycin SV.
15. The aldimino derivative of 3-formyl-rifamycin SV with 4-methyl-1-aminopiperazine.

No references cited.

WALTER A. MODANCE, *Primary Examiner.*
ROBERT T. BOND, *Assistant Examiner.*